United States Patent
Ishibashi et al.

(10) Patent No.: US 11,433,746 B2
(45) Date of Patent: Sep. 6, 2022

(54) PROTECTOR WITH SENSOR

(71) Applicants: NISHIKAWA RUBBER CO., LTD., Hiroshima (JP); AISIN SEIKI KABUSHIKI KAISHA, Kariya (JP)

(72) Inventors: Hiroshi Ishibashi, Hiroshima (JP); Masahiro Kojima, Hiroshima (JP); Michihiko Matsumoto, Hiroshima (JP); Wataru Hattori, Kariya (JP)

(73) Assignees: NISHIKAWA RUBBER CO., LTD., Hiroshima (JP); AISIN SEIKI KABUSHIKI KAISHA, Aichi-Ken (JP)

( * ) Notice: Subject to any disclaimer, the term of this patent is extended or adjusted under 35 U.S.C. 154(b) by 185 days.

(21) Appl. No.: 17/029,105

(22) Filed: Sep. 23, 2020

(65) Prior Publication Data

US 2021/0107340 A1  Apr. 15, 2021

(30) Foreign Application Priority Data

Oct. 10, 2019  (JP) .............................. JP2019-187133

(51) Int. Cl.
*B60J 5/04* (2006.01)

(52) U.S. Cl.
CPC ............. *B60J 5/0468* (2013.01); *B60J 5/047* (2013.01)

(58) Field of Classification Search
CPC . B60J 5/0468; B60J 5/047; B60J 10/02; B60J 10/08
USPC .......... 296/152; 428/31, 122, 332, 358, 457, 428/465
See application file for complete search history.

(56) References Cited

U.S. PATENT DOCUMENTS

| 6,849,310 B2 * | 2/2005 | Willett ..................... B60J 10/17 49/490.1 |
| 9,441,408 B2 * | 9/2016 | Matsumoto ............ H01H 3/142 |
| 9,759,003 B2 | 9/2017 | Hirakawa et al. |

(Continued)

FOREIGN PATENT DOCUMENTS

| JP | 6424074 B2 | 10/2018 |
| JP | 2019187136 A | 10/2019 |

OTHER PUBLICATIONS

U.S. Appl. No. 17/016,487; First Named Inventor: Michihiko Matsumoto; Title: "Protector with Sensor"; filed Sep. 10, 2020.

(Continued)

*Primary Examiner* — D Glenn Dayoan
*Assistant Examiner* — Sunsurraye Westbrook
(74) *Attorney, Agent, or Firm* — Holtz, Holtz & Volek PC (57) ABSTRACT

A protrusion is formed on a first part of an inner-cabin side wall of an installation base member of a protector with a sensor. The first part is closer to a connecting wall than a second part opposite the first part. The protrusion is on a virtual line in cross section. The virtual line is where convex substances, keys for example, hanging on passengers' clothes conceivably pass through. The virtual line extends toward a connecting point from a rear part of an automobile body closer to an interior of the automobile body than a reference line. The reference line is parallel with a direction in which a flange protrudes and extends from the connecting point. The connecting point is a part of an inner-cabin side end of a hollow part closest to an interior of the automobile body. The inner-cabin side end is connected with the installation base member.

4 Claims, 9 Drawing Sheets

(56) References Cited

U.S. PATENT DOCUMENTS

| | | | | |
|---|---|---|---|---|
| 2016/0145927 | A1* | 5/2016 | Hirakawa | B60J 10/273 296/1.04 |
| 2017/0342757 | A1* | 11/2017 | Kikuta | H02P 7/05 |
| 2020/0157872 | A1 | 5/2020 | Matsumoto et al. | |
| 2020/0223295 | A1 | 7/2020 | Matsumoto et al. | |

OTHER PUBLICATIONS

U.S. Appl. No. 17/027,806; First Named Inventor: Michihiko Matsumoto; Title: "Protector with Sensor"; filed Sep. 22, 2020.
Japanese Patent Application No. 2019-187136 and English translation of claims.

* cited by examiner

PROTECTOR WITH SENSOR

CROSS REFERENCE TO RELATED APPLICATION

This application claims the benefit under 35 USC § 119 of JP Patent Application JP 2019-187133 filed Oct. 10, 2019, the entire disclosure of which is incorporated herein by reference.

BACKGROUND INFORMATION

The present invention relates to a protector with a sensor. When an object including a finger is disposed between an opening of an automobile body and a sliding door, the sensor fixed in the protector outputs a corresponding signal upon detecting the object. The sliding door is for use on a wagon, a station wagon, or the like and moves between at least two positions to open and close the opening of the automobile body.

Figure 6:
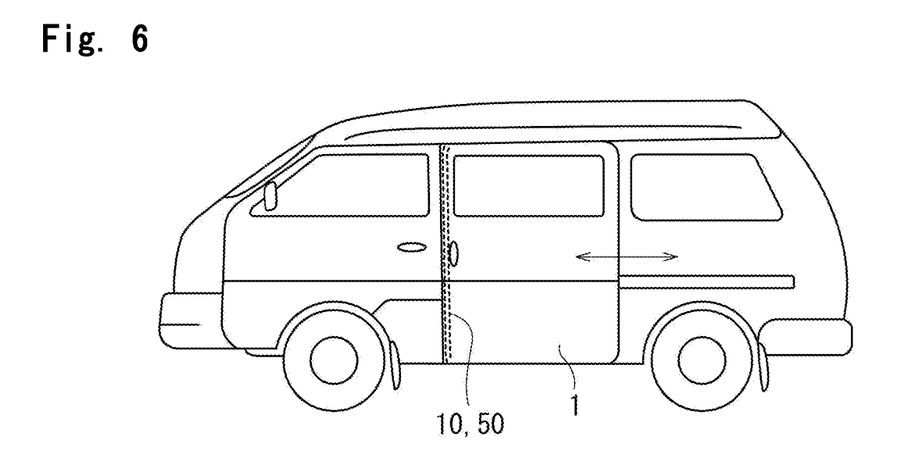
FIG. 6 is a side view of an automobile with a sliding door which opens and closes an opening of an automobile body.

A protector 10 with a sensor couples to an automobile including a wagon illustrated in FIG. 6. A sliding door 1 of the wagon opens and closes the opening of the automobile body.

Figure 7:
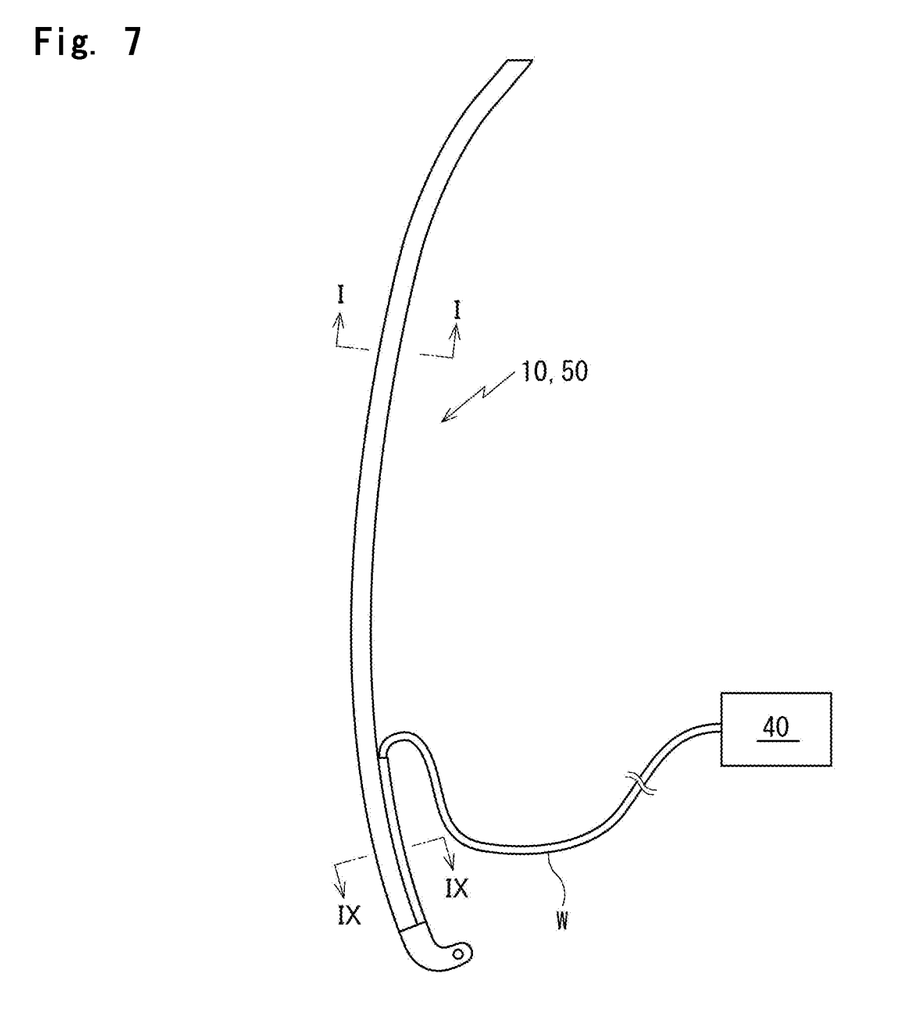
FIG. 7 is a side view of a protector illustrated in FIG. 6 with a sensor.

The protector 10 couples to a front end surface of the sliding door 1 and extends toward a front part of the automobile body from the front end surface. The protector 10 extends in an upper and lower direction of the automobile body as illustrated in FIG. 7.

Figure 8:
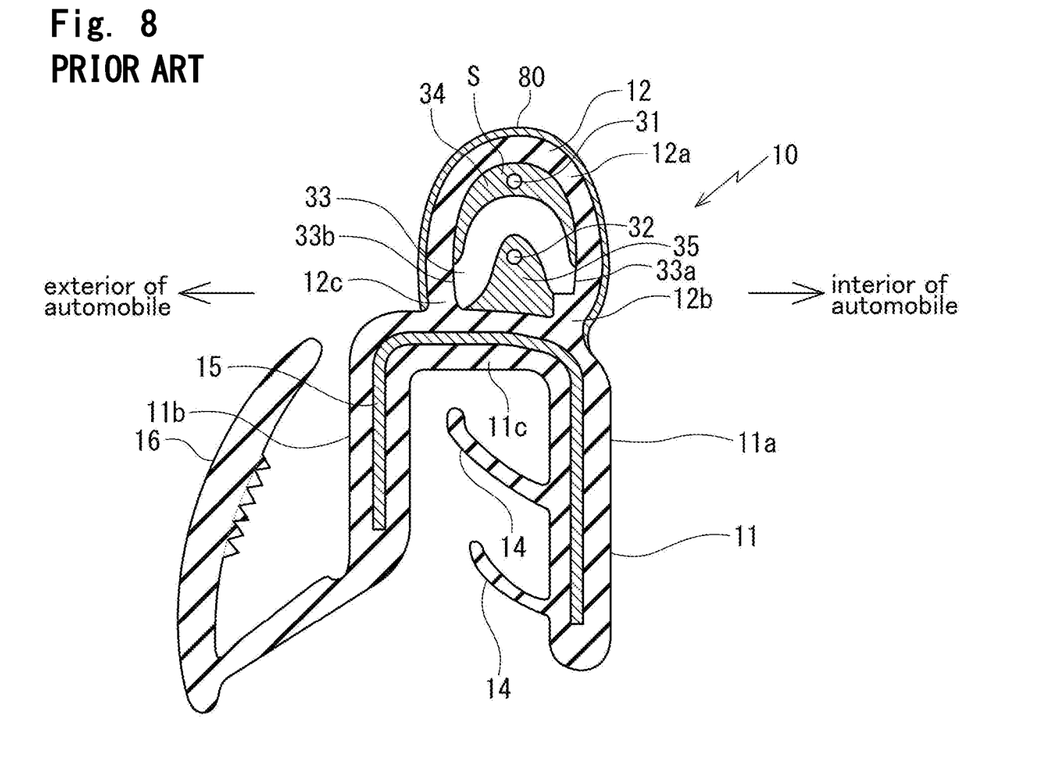
FIG. 8 is an enlarged cross sectional view of a protector according to a prior art taken along line I-I of FIG. 7 with a sensor.
Figure 9:
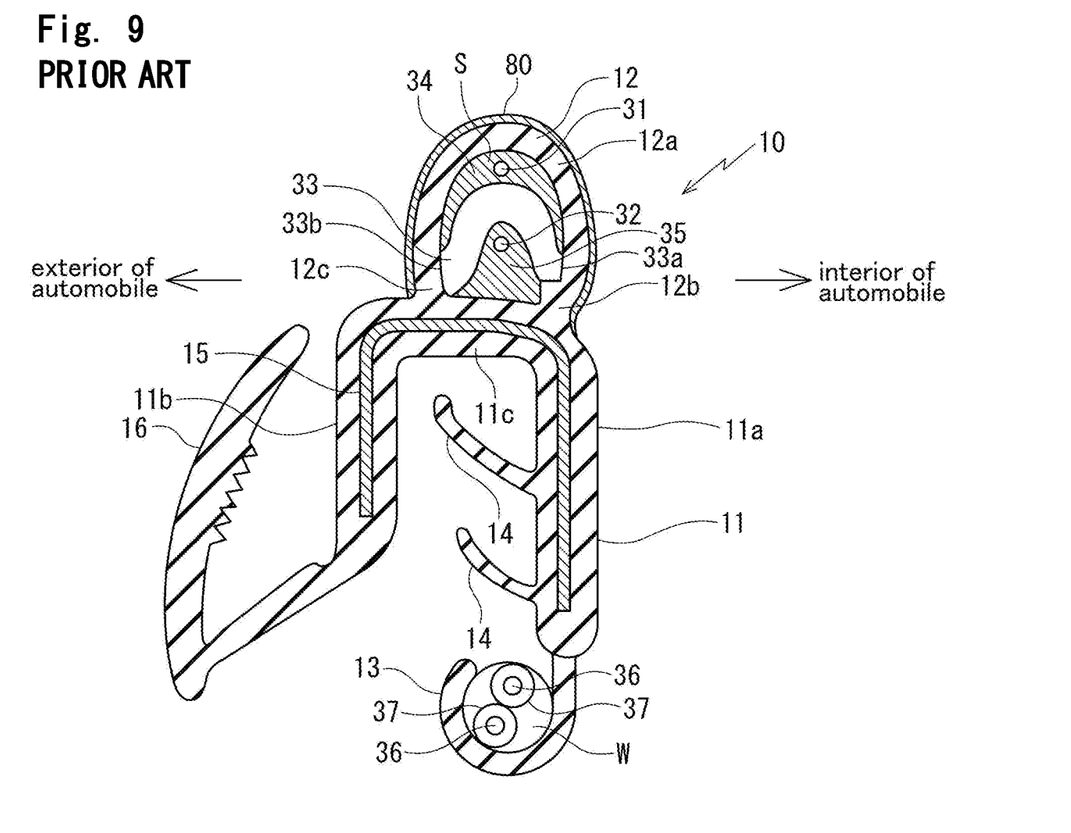
FIG. 9 is an enlarged cross sectional view of the protector according to the prior art taken along line IX-IX of FIG. 7 with the sensor.

As illustrated in FIG. 8 and FIG. 9, the protector 10, which couples to the front end surface of the sliding door 1, includes an installation base member 11 and a hollow part 12. The installation base member 11 has a substantially U-shaped cross section including an inner-cabin side wall 11a, an outer-cabin side wall 11b and a connecting wall 11c. The hollow part 12 is integrally formed with the installation base member 11. The hollow part 12 includes a sensor (pressure sensitive sensor) S. The sensor S outputs a corresponding electric signal upon detecting the object such as a part of human bodies (fingers, hands, or legs) between the sliding door 1 and the opening of the automobile body (may also be a front door or a side door) (see, for example, Japanese Patent No. 6424074).

An outer peripheral surface of the hollow part 12 is an outer coat 12a. The outer coat 12a has a substantially egg-shaped cross section (substantially elliptic cross section) and has an inner-cabin side end 12b and an outer-cabin side end 12c. Each of the inner-cabin side end 12b and the outer-cabin side end 12c are connected with the installation base member 11 and are at a distance from each other along the installation base member 11.

In a lower part of the protector 10, a channel part 13 is integrally formed with the inner-cabin side wall 11a of the installation base member 11. The channel part 13 has a substantially C-shaped cross section and holds a wire harness W. The wire harness W is joined with the pressure sensitive sensor S. The installation base member 11 has a plurality of holding lips 14, 14 formed inside and a core 15 embedded. The core 15 has a substantially U-shaped cross section and increases rigidity of the installation base member 11. In addition, a decorative lip 16 is provided on the outer-cabin side wall 11b of the installation base member 11.

The sensor (pressure sensitive sensor) S is fixed in the hollow part 12. The hollow part 12 has two core wires (electrode wires) 31, 32, rubber like elastic bodies 34, 35, and a space 33. The core wires 31, 32 extend in an upper and lower direction (longitudinal direction) of the hollow part 12 and are embedded in the rubber like elastic bodies (first and second conductive parts) 34, 35. The rubber like elastic bodies 34, 35 have electric conductivity. The space 33 is positioned between the rubber like elastic bodies 34, 35. When the object is disposed between the sliding door 1 and the opening when the sliding door 1 is moved towards a closed position, and makes contact with a part of the hollow part 12, the rubber like elastic bodies 34, 35 come into contact with each other and the two core wires 31, 32 short-circuit. Resultant change in electric signal is transmitted to a control unit 40 by leads 36, 36, and as a result, the object is detected. The leads 36, 36 are connected with the two core wires 31, 32 in a lower side terminal part of the protector 10. The leads 36, 36 are covered with insulator and are tied by the wire harness W. Top ends of the leads 36, 36 are bared from covered parts 37 and are naked wires.

The rubber like elastic bodies (first and second conductive parts) 34, 35 include the first conductive part 34 on an upper part of the hollow part and the second conductive part 35 on a lower part of the hollow part. The first conductive part 34 has a concave shape and the second conductive part 35 has a convex shape in cross section of the hollow part 12. The first and second conductive parts 34, 35 are shaped and positioned in a manner that the space 33, positioned between the first conductive part 34 and the second conductive part 35, has a substantially V-shaped cross section, the space 33 has a substantially uniform width in cross section, and an opening of the V-shaped cross section faces the installation base member 11. With this configuration, the sensor (pressure sensitive sensor) S detects the objects over a wider range.

Parts of an inner peripheral surface of the hollow part 12 without the first and second conductive parts 34, 35, in other words where an inner-cabin space end 33a and an outer-cabin space end 33b of the space 33 are defined, are weak in strength. Accordingly, in case convex substances, keys for example, strongly touch the parts weak in strength while passengers are getting on or off the automobiles, the parts may be damaged or torn. Once the hollow part 12 is torn, rainwater or water for car washing enters and sensor function is lost. The absence of the sensor function may cause malfunction including improper opening or closing of the sliding door 1. In this connection, Japanese Patent No. 6424074 is directed to a coating layer 80. The coating layer 80 has a hardness higher than that of the hollow part 12 and covers an outer peripheral surface of an outer coat 12a of the hollow part 12 entirely or locally.

Unfortunately, however, the protector 10, illustrated in FIG. 8 and FIG. 9, necessitates an extra process of forming the coating layer 80. This configuration lowers productivity of molding by extrusion.

Also, the hollow part 12 with the coating layer 80 is harder to bend than the hollow part 12 without the coating layer 80. This configuration may degrade precise sensitivity of the sensor (pressure sensitive sensor) S for detecting the objects.

Experimental results on the origins of the damages and tears show that the hollow part 12 is often damaged or torn by the convex substances hanging around the passengers' waists, keys on belts for example. The convex substances are pressed against the inner-cabin side end 12b of the hollow part 12 strongly and repeatedly from an interior of the automobile body especially while the passenger is getting off the automobiles, and rupture the hollow part 12.

In this connection, there has been a strong demand for preventive measures against the damages on the hollow part 12 exclusively by the convex substances from the interior of the automobile body.

Therefore, an object of the present invention is to provide the protector with the sensor capable of preventing the damages caused by the objects which touch the hollow part. It is another object of the present invention to provide the protector with the sensor improved in sensibility.

SUMMARY

In order to achieve the above-mentioned object, according to one aspect of the invention, a protector (10, 50) with a sensor is provided. The protector (10, 50) includes an installation base member (11) and a hollow part (12, 52). The installation base member (11) couples to a flange (F) of a sliding door (1). The flange (F) protrudes toward a front part of an automobile body from a front edge of the sliding door (1). The sliding door (1) moves between at least two positions to open and close a door opening of the automobile body. The installation base member (11) has a substantially U-shaped cross section including an inner-cabin side wall (11*a*), an outer-cabin side wall (11*b*), and a connecting wall (11*c*). The connecting wall (11*c*) connects the side walls (11*a*, 11*b*). The installation base member (11) extends in an upper and lower direction of the automobile body. The hollow part (12, 52) is unified with the connecting wall (11*c*) of the installation base member (11) and extends toward the front part of the automobile body. The hollow part (12, 52) has a shape of a tube. The hollow part (12, 52) has core wires (31, 32), first and second conductive parts (34, 35, 54, 55), and a space (33, 53). Each of the first and second conductive parts (34, 35, 54, 55) have a respective one of the core wires (31, 32) embedded. The space (33, 53) is positioned between the first and second conductive parts (34, 35, 54, 55).

The hollow part (12, 52) has an inner-cabin side end (12*b*, 52*b*) and an outer-cabin side end (12*c*, 52*c*). Each of the inner-cabin side end (12*b*, 52*b*) and the outer-cabin side end (12*c*, 52*c*) are connected with the installation base member (11) and are at a distance from each other along the installation base member (11).

The first and second conductive parts (34, 35, 54, 55) include the first conductive part (34, 54) on an upper part of the hollow part and the second conductive part (35, 55) on a lower part of the hollow part. The second conductive part (35, 55) is positioned within the hollow part (12, 52) between the inner-cabin side end (12*b*, 52*b*) and the outer-cabin side end (12*c*, 52*c*) adjacent the installation base member (11) and the first conductive part (34, 54) is spaced apart from the second conductive part (35, 55). The first and second conductive parts (34, 35, 54, 55) are shaped and positioned in a manner that an inner-cabin space end (33*a*, 53*a*) of the space (33, 53) is defined on an inner surface of a part of an outer coat (12*a*, 52*a*) closer to an interior of the automobile body of the hollow part (12, 52).

When an object is disposed between the sliding door (1) and the opening, and makes contact with the hollow part (12, 52) when the sliding door (1) is moved towards a closed position, an electric signal provides an indication that the object is in the opening.

A protrusion (100) is formed on a first part of the inner-cabin side wall (11*a*) of the installation base member (11). The first part is closer to the connecting wall (11*c*) than a second part opposite the first part. The protrusion (100) is on a virtual line (LS) in cross section. The virtual line (LS) is where convex substances hanging on passengers' clothes conceivably pass through. The virtual line (LS) extends toward a connecting point (Q) from a rear part of the automobile body closer to the interior of the automobile body than a reference line (LB). The reference line (LB) is parallel with a direction in which the flange (F) protrudes and extends from the connecting point (Q). The connecting point (Q) is a part of the inner-cabin side end (12*b*, 52*b*) of the hollow part (12, 52) closest to the interior of the automobile body. The inner-cabin side end (12*b*, 52*b*) is connected with the installation base member (11).

It is to be noted that the "change in electric signal" includes a change by short between the two core wires, and a change in capacitance.

In addition, according to an aspect of the present invention, the protrusion (100) includes a part (101). The part (101) protrudes toward the interior of the automobile body from the inner-cabin side wall (11*a*) and extends between a first end of the inner-cabin side wall (11*a*) closest to the connecting wall (11*c*) and a second end opposite the first end.

In addition, according to an aspect of the present invention, the virtual line (LS) overlaps with an oblique line. The oblique line extends toward the rear part of the automobile body closer to the interior of the automobile body than the reference line (LB) from the connecting point (Q) with an angle θ of inclination to the reference line (LB) of 25 degrees.

Symbols in parentheses show constituents or items corresponding to the drawings.

According to the present invention, the protrusion is formed on the first part of the inner-cabin side wall of the installation base member of the protector with the sensor. The first part is closer to the connecting wall than the second part opposite the first part. The protrusion is on the virtual line where the convex substances, keys for example, hanging on the passengers' clothes conceivably pass through. Accordingly, the protrusion keeps the convex substances away from the connecting point which is the part of the inner-cabin side end of the hollow part closest to the interior of the automobile body. Even in case the convex substances touch the hollow part, the protrusion guides the convex substances to a part of the hollow part closer to a top end than the connecting point.

More specifically, in case the convex substances touch the connecting point, the hollow part hardly deforms and is subjected to shock from the convex substances directly. On the other hand, in case the convex substances hit the protrusion first and then touch the part of the hollow part closer to the top end than the connecting point, the hollow part deforms toward an exterior of the automobile body and releases the shock applied on the hollow part. With this configuration, damages on the hollow part by the convex substances are prevented.

In addition, the convex substances touch the part of the hollow part slightly closer to the top end than the connecting point, not the connecting point. With this configuration, friction between the convex substances and the hollow part is smaller than friction between the convex substances and the connecting point. The smaller friction between the convex substances and the hollow part decreases abrasion loss. With this configuration, damages on the hollow part are prevented.

The damages on the hollow part are effectively prevented merely by forming the protrusion on the inner-cabin side wall of the installation base member. This configuration eliminates the need for providing a coating layer on the hollow part. The hollow part, without the coating layer, is not hard to bend in a front and rear direction of the automobile body. Since the hollow part is not hard to bend, the sensor (pressure sensitive sensor) is not degraded in precise sensitivity for detecting the objects.

The resultant protector is improved in sensibility.

In addition, the protrusion may include the part which protrudes toward the interior of the automobile body and extends between the first end of the inner-cabin side wall closest to the connecting wall and the second end opposite the first end. In other words, the part extends from a whole surface of the inner-cabin side wall, not locally from a limited range of the inner-cabin side wall. The part which protrudes toward the interior of the automobile body is on the virtual line.

In addition, the virtual line overlaps with the oblique line. The virtual line is found by testing routes through which the convex substances hanging around the passengers' waists, keys on belts for example, approach the connecting point. The oblique line extends toward the rear part of the automobile body closer to the interior of the automobile body than the reference line from the connecting point with the angle of inclination to the reference line of 25 degrees. The protrusion, formed on the virtual line, prevents ruptures on the hollow part by the convex substances which strongly touch the hollow part.

DETAILED DESCRIPTION

Referring to the Drawings, a protector 10 according to an embodiment of the present invention with a sensor will be described. It is to be noted that "front and a rear" indicates a front and rear direction of an automobile body. "Upper and lower" used with respect to the automobile body indicates an upper and lower direction of the automobile body. "Upper" used with respect to the protector 10 indicates a part closer to a hollow part 12 and "lower" indicates a part closer to an installation base member 11.

Figure 1:
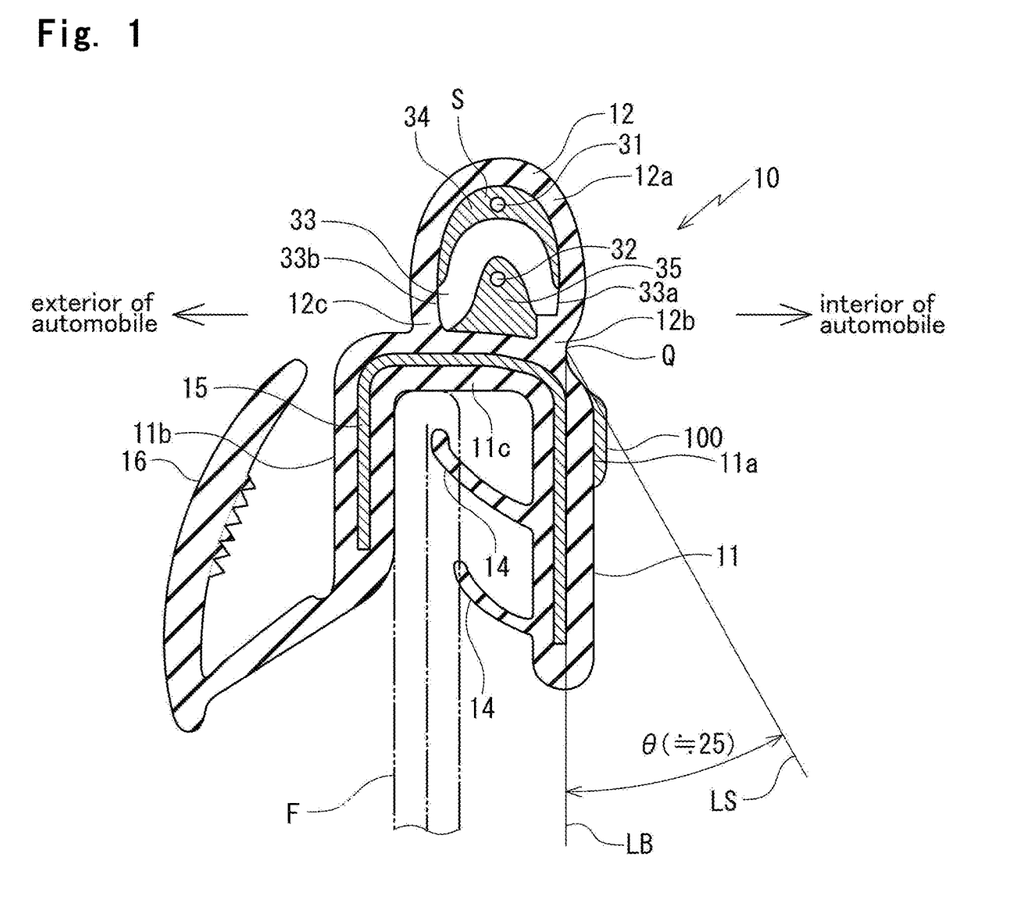
FIG. 1 is an enlarged cross sectional view of a protector according to an embodiment of the present invention taken along line I-I of FIG. 7 with a sensor.

The protector 10 couples to a front end surface of a sliding door 1 and extends toward a front part of an automobile body from the front end surface. The sliding door 1 moves between at least two positions to open and close an opening of the automobile body illustrated in FIG. 6. A sensor (pressure sensitive sensor) S is fixed in the protector 10 and outputs a corresponding electric signal upon detecting an object such as a part of human bodies (fingers, hands, or legs) between the sliding door 1 and the opening of the automobile body (may also be a front door or a side door). The present invention illustrated in FIG. 1 and the prior art illustrated in FIG. 8 share the configuration illustrated in FIG. 7 in common. FIG. 1 is an enlarged cross sectional view of the protector 10 taken along line I-I of FIG. 7 with the sensor (pressure sensitive sensor) S fixed. The present invention illustrated in FIG. 1 differs from the prior art illustrated in FIG. 8 in that a protrusion 100 is formed. When constituents or items correspond to those in prior arts, the same symbols are used.

As illustrated in FIG. 1, the protector 10 includes the installation base member 11, the hollow part 12, and the sensor (pressure sensitive sensor) S. The installation base member 11 directly couples to a flange F formed on the sliding door 1. The installation base member 11 has a substantially U-shaped cross section including an inner-cabin side wall 11a, an outer-cabin side wall 11b, and a connecting wall 11c. The hollow part 12 is integrally formed with the installation base member 11 and has a shape of a tube. The hollow part 12 makes contact with the object when the object including fingers is disposed between the front end surface of the sliding door 1 and the opening of the automobile body. The front end surface faces the opening of the automobile body. The sensor (pressure sensitive sensor) S is fixed in the hollow part 12 and outputs a corresponding electric signal upon detecting the object. The hollow part 12 has core wires (electrode wires) 31, 32, rubber like elastic bodies 34, 35, and a space 33. The core wires 31, 32 extend in an upper and lower direction (longitudinal direction which is a direction parallel to the peripheral edge of the opening) of the hollow part 12. Each of the rubber like elastic bodies 34, 35 have a respective one of the core wires 31, 32 embedded. The rubber like elastic bodies 34, 35 have electric conductivity. The space 33 is positioned between the rubber like elastic bodies 34, 35. The rubber like elastic bodies 34, 35, which have electric conductivity, include electric conductive rubber mainly composed of synthetic rubber including EPDM. The sensor S is integrally formed with the hollow part 12. The hollow part 12 does not have electric conductivity.

The installation base member 11 has a plurality of holding lips 14, 14 formed inside and a core 15 embedded. The core 15 has a substantially U-shaped cross section and increases rigidity of the installation base member 11. In addition, a decorative lip 16 is provided on the outer-cabin side wall 11b of the installation base member 11.

The hollow part 12 is integrally formed with the connecting wall 11c of the installation base member 11. A top end part of the hollow part 12 protrudes toward the front part of the automobile body.

Each of ends (an inner-cabin side end) 12b, (an outer-cabin side end) 12c of the hollow part 12 are connected with the connecting wall 11c and are at a distance from each other along the installation base member 11.

In the present embodiment, the inner-cabin side end 12b of the hollow part 12 is connected with a corner where the connecting wall 11c is connected with the inner-cabin side wall 11a. The outer-cabin side end 12c of the hollow part 12 is connected with a part of the connecting wall 11c slightly closer to the interior of the automobile body than a corner where the connecting wall 11c is connected with the outer-cabin side wall 11b. More specifically, in the present embodiment, the outer-cabin side end 12c is connected with the part of the connecting wall 11c closer to the exterior of the automobile body than a central line which divides the installation base member 11 in cross section in two equal halves in an inner-cabin and outer-cabin direction.

The rubber like elastic bodies 34, 35, which have electric conductivity, include a first conductive part 34 on an upper part of the hollow part and a second conductive part 35 on a lower part of the hollow part. The second conductive part 35 is positioned within the hollow part 12 between the inner-cabin side end 12b and the outer-cabin side end 12c adjacent the installation base member 11 and the first conductive part 34 is spaced apart from the second conductive part 35. The first conductive part 34 has the core wire 31 embedded at a center and the second conductive part 35 has the core wire 32 embedded at a center. In general, the rubber like elastic bodies 34, 35, which have electric conductivity, include solid materials without air bubbles.

Shapes and positions of the first and second conductive parts 34, 35 in the hollow part 12 determine the shape of the space 33 in cross section between first and second conductive parts 34, 35. In the present embodiment, the space 33 has a substantially V-shaped cross section with an opening of the V shape facing the installation base member 11. Also, an inner-cabin space end 33a and an outer-cabin space end 33b of the space 33 are defined on an inner surface of an outer coat 12a of the hollow part 12.

Another possible embodiment is that a part of outer-cabin space end 33b is defined on the connecting wall 11c as well as the inner surface of the outer coat 12a.

The second conductive part 35 has a substantially ridge-shaped cross section with a base of the ridge-shaped cross section in contact with the connecting wall 11c of the installation base member 11. The first conductive part 34 has a substantially crescent-shaped cross section. Both ends on lower parts of the first conductive part 34 are closer to the installation base member 11 than an apex of the second conductive part 35. With this configuration, even in case the hollow part 12 slightly bends, the first and second conductive parts 34, 35 easily come into contact with each other, and do not pass each other on a point of contact. In addition, an axis of symmetry bilaterally divides the first and second conductive parts 34, 35 and the space 33 in the hollow part 12 as well as the hollow part 12 into two equal halves in an inner-cabin and outer-cabin direction. Also, the core wires 31, 32 are on the axis of symmetry. In general, the rubber like elastic bodies 34, 35, which have electric conductivity, include solid materials without air bubbles.

The installation base member 11 and the hollow part 12 of the protector 10 are formed by extrusion molding and include a rubber like elastic body without electric conductivity. The rubber like elastic body is composed of synthetic rubber such as EPDM, and thermoplastic elastomer such as TPO, TPS. Upper and lower side terminal parts of the protector 10 relative to the automobile body are formed by die molding to arrange external shapes of the terminal parts. Since the hollow part 12 of the protector 10 necessitates flexibility, the hollow part 12 may include a foamed sponge material. In the same manner, the installation base member 11 may include the foamed sponge material.

A protrusion 100 is formed on a first part of the inner-cabin side wall 11a of the installation base member 11 of the protector 10 in cross section. The first part is closer to the connecting wall 11c than a second part opposite the first part. The protrusion 100 protrudes toward the interior of the automobile body.

A thickness of the protrusion 100 is sized and dimensioned to be on a virtual line LS, in other words to be closer to the interior of the automobile body than the virtual line LS. The virtual line LS is where convex substances, keys for example, hanging on passengers' clothes conceivably pass through. The virtual line LS extends toward a connecting point Q from a rear part of the automobile body closer to the interior of the automobile body than a reference line LB. The reference line LB is parallel with a direction in which the flange F protrudes and extends from the connecting point Q. The connecting point Q is a part of the inner-cabin side end 12b of the hollow part 12 closest to the interior of the automobile body. The inner-cabin side end 12b is connected with the installation base member 11. A first end (upper side surface) and a second end (lower side surface) of the protrusion 100 are formed into oblique surfaces.

The virtual line LS is found by testing routes through which the convex substances approach the connecting point Q. In the present embodiment, the test for finding the virtual line LS is specific to the convex substances hanging around the passengers' waists, keys on belts for example, because experimental results show that the hollow part 12 is often damaged or torn by the convex substances hanging around the passengers' waists. The convex substances are pressed against the hollow part 12 strongly from the interior of the automobile body especially while the passengers are getting off the automobiles, and rupture the hollow part 12. It is to be noted that the convex substances are not limited to the keys.

In the present embodiment, the virtual line LS overlaps with an oblique line. The oblique line is closer to the interior of the automobile body than the reference line LB with an angle θ of inclination to the reference line LB of 25 degrees. The virtual line LS is where the convex substances hanging around the passengers' waists, keys on belts for example, conceivably pass through.

Since the protrusion 100 is on the virtual line LS, the protrusion 100 keeps the convex substances hanging around the passengers' waists, keys on belts for example, away from the connecting point Q. The connecting point Q is the part of the inner-cabin side end 12b of the hollow part 12 closest to the interior of the automobile body. Even in case the convex substances touch the hollow part 12, the protrusion 100 guides the convex substances to a part of the hollow part 12 closer to a top end P than the connecting point Q.

More specifically, in case the convex substances touch the connecting point Q, the hollow part 12 hardly deforms, and therefore is subjected to shock from the convex substances directly. On the other hand, in case the convex substances touch the part of the hollow part 12 closer to the top end P than the connecting point Q, the hollow part 12 deforms toward an exterior of the automobile body and releases the shock applied on the hollow part 12. With this configuration, damages on the hollow part 12 are prevented.

In addition, the convex substances touch the part of the hollow part 12 slightly closer to the top end P than the connecting point Q, not the connecting point Q. With this configuration, friction between the convex substances and the hollow part 12 is smaller than friction between the convex substances and the connecting point Q.

The smaller friction between the convex substances and the hollow part 12 decreases abrasion loss. With this configuration, damages on the hollow part 12 are prevented.

In the present embodiment, the hollow part 12 has a material hardness of 70 such that hollow part 12 is temperately enhanced in load, not to excess.

In addition, a coating continuously covers the protrusion 100 as well as an entire outer surface of the hollow part 12. The coating is high in abrasion resistance.

Another possible embodiment is that the hollow part 12 and the sensor S are integrally formed, and the installation base member 11 is separately formed (illustration omitted).

While in the present embodiment the installation base member 11 has the plurality of holding lips 14, 14 formed inside and the core 15, having the substantially U-shaped cross section, embedded, this should not be construed in a limiting sense. Another possible embodiment is that the installation base member 11 has a singular holding lip 14 or does not have the core 15 embedded.

Figure 2:
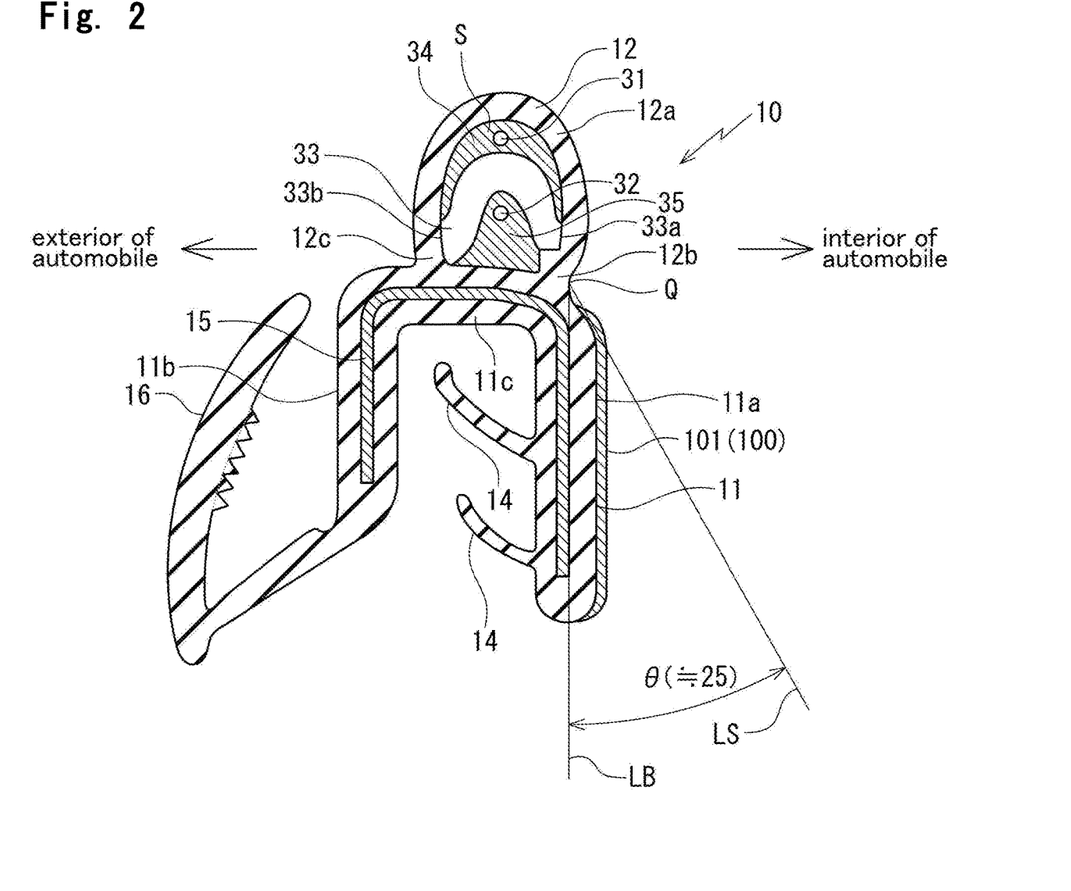
FIG. 2 is an enlarged cross sectional view of a protector according to another embodiment of the present invention taken along line I-I of FIG. 7 with the sensor.

While in the present embodiment the protrusion 100 is formed on the first part of the inner-cabin side wall 11a of the installation base member 11 closer to the connecting wall 11c than the second part opposite the first part, this should not be construed in a limiting sense. In the present invention, it is only required that the protrusion 100 is on the virtual line LS. Another possible embodiment is, as illustrated in FIG. 2, that the protrusion 100 includes a part 101. The part 101 protrudes toward the interior of the automobile body from the inner-cabin side wall 11a and extends between a first end of the inner-cabin side wall 11a closest to the connecting wall 11c and a second end opposite the first end. In other words, the part 101 extends from a whole surface of the inner-cabin side wall 11a, not locally from a limited range of the inner-cabin side wall 11a. The part 101, which protrudes toward the interior of the automobile body, is on the virtual line LS.

Figure 3:
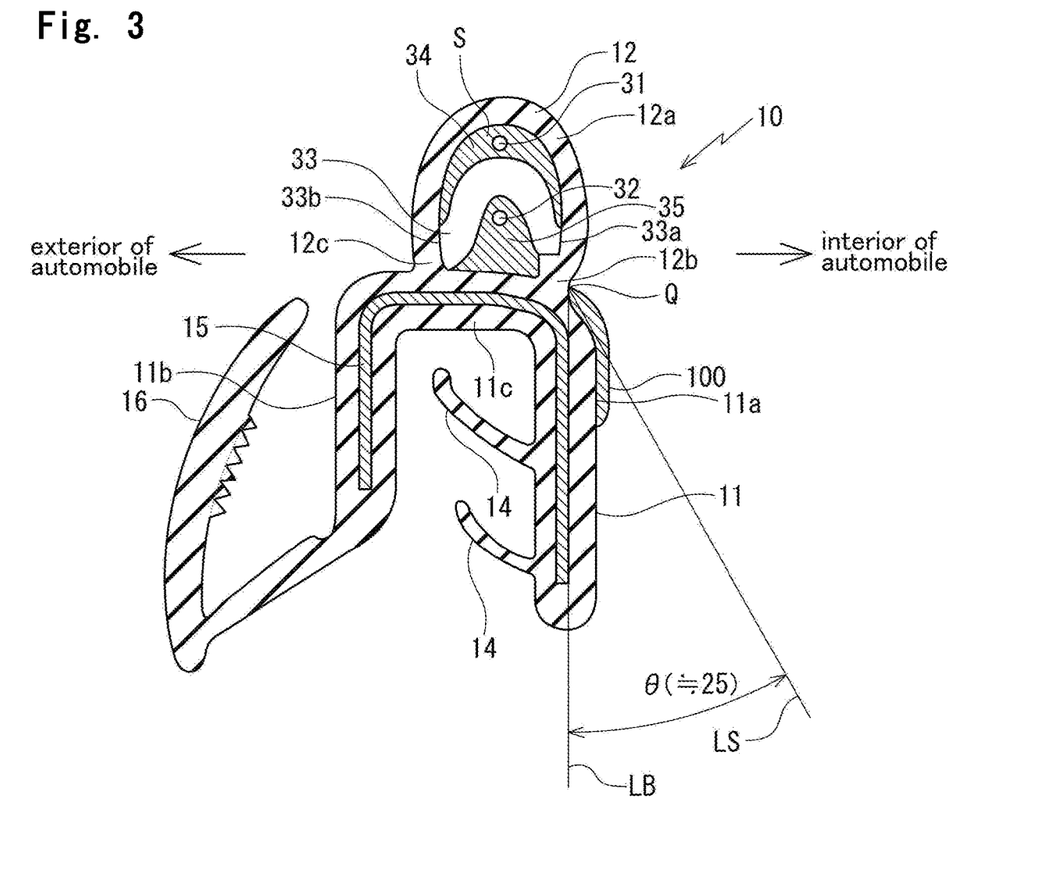
FIG. 3 is an enlarged cross sectional view of a protector according to another embodiment of the present invention taken along line I-I of FIG. 7 with the sensor.

While in the present embodiment the first and second ends (upper and lower side surfaces) of the protrusion 100 are formed into the oblique surfaces, this should not be construed in a limiting sense. Another possible embodiment is, as illustrated in FIG. 3, that the first end (upper side surface) of the protrusion 100 is formed into a curved surface to cover the corner where the connecting wall 11c is connected with the inner-cabin side wall 11a. The curved surface is defined according to a variable radius, and an outer surface of the curved surface is smoothed.

Figure 4:
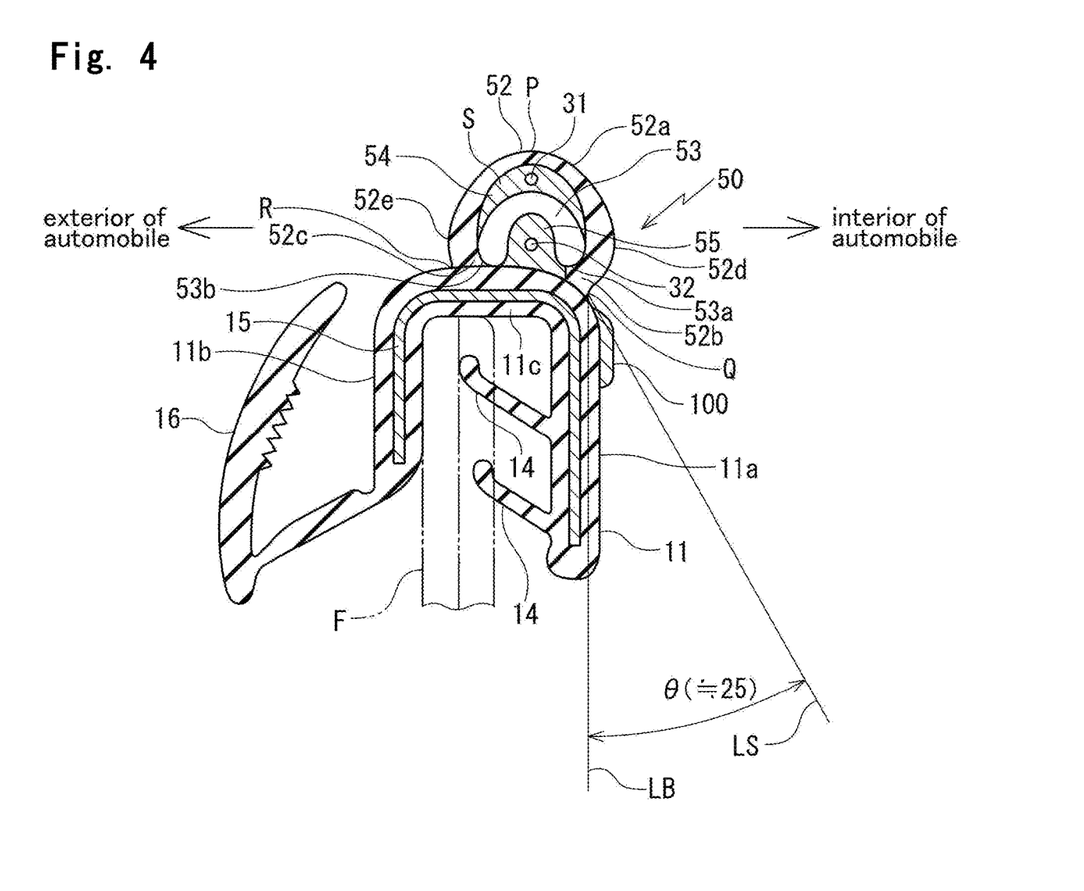
FIG. 4 is an enlarged cross sectional view of a protector according to another embodiment of the present invention taken along line I-I of FIG. 7 with a sensor.

While in the present embodiment the outer peripheral surface of the hollow part 12 is the outer coat 12a, which has the substantially egg-shaped cross section (substantially elliptic cross section), this should not be construed in a limiting sense. Another possible embodiment is, as illustrated in FIG. 4, a hollow part 52 of a protector 50 in cross section shrinks in a front and rear direction of the automobile body in the same manner as a pantograph.

The hollow part 52 includes an outer coat 52a. The outer coat 52a includes an inner-cabin side part and an outer-cabin side part. The inner-cabin side part of the outer coat 52a extends between a top end P and an inner-cabin side end 52b, and is curved toward the interior of the automobile with an inner-cabin side apex 52d on a position closest to the interior of the automobile. The outer-cabin side part of the outer coat 52a extends between the top end P and an outer-cabin side end 52c, and is curved toward the exterior of the automobile with an outer-cabin side apex 52e on a position closest to the exterior of the automobile.

Each of the apexes 52d, 52e have curved surfaces. A distance on a curvilinear surface between the top end P of the hollow part 52 and the apex 52d is longer than a distance on the curvilinear surface between the apex 52d and the inner-cabin side end 52b. A distance on the curvilinear surface between the top end P and the apex 52e is longer than a distance on the curvilinear surface between the apex 52e and the outer-cabin side end 52c.

Figure 5:
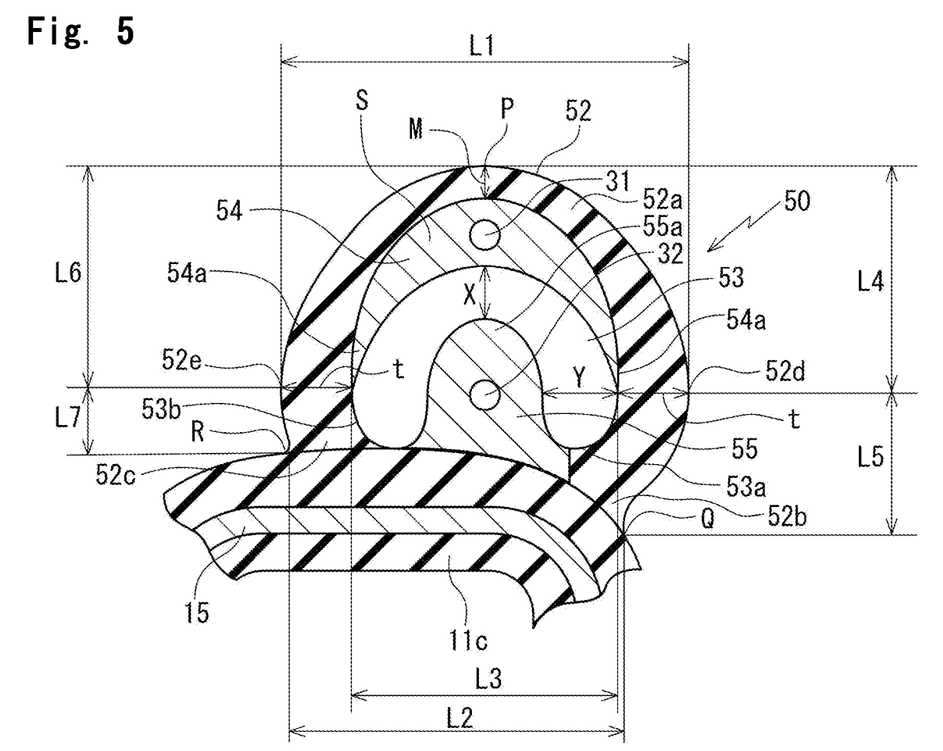
FIG. 5 is an enlarged cross sectional view of an important part of the protector illustrated in FIG. 4.

More specifically, as illustrated in FIG. 5, a distance L5 in a height direction between the apex 52d and the connecting point Q of the hollow part 52 is shorter than a distance L4 in the height direction between the top end P and the apex 52d. The connecting point Q is a part of the inner-cabin side end 52b closest to the interior of the automobile body. In the same manner, a distance L7 in the height direction between the apex 52e and a connecting point R of the hollow part 52 is shorter than a distance L6 in the height direction between the top end P and the apex 52e. The connecting point R is a part of the outer-cabin side end 52c closest to the exterior of the automobile body.

Further specifically, as illustrated in FIG. 5, the distance L5 is 0.7 time as long as the distance L4, and the distance L7 is 0.3 time as long as the distance L6.

The outer coat 52a of the hollow part 52 is gradually increased in thickness toward each of the apexes 52d, 52e from the top end P of the hollow part 52. The outer coat 52a has thicknesses "t" on each of the apexes 52d, 52e. The thicknesses "t" are not less than twice, twice in the present embodiment, a thickness M on the top end P of the hollow part 52.

While in the present embodiment the outer coat 52a is uniform in the thicknesses "t" in a distance between the apex 52d and the inner-cabin side end 52b and in a distance between the apex 52e and the outer-cabin side end 52c, this should not be construed in a limiting sense. Another possible embodiment is that the outer coat 52a is gradually increased in thickness toward the inner-cabin side end 52b from the apex 52d and toward the outer-cabin side end 52c from the apex 52e.

A second conductive part 55 on a lower part of the hollow part has a hanging-bell-shaped cross section. A space 53 has a width X at a center of the space 53 in cross section in the front and rear direction of the automobile body (upper and lower direction of the hollow part 52). The width X is gradually increased toward each of the apexes 52d, 52e, and the space 53 has widths Y on the apexes 52d, 52e. The widths Y are greater than at least one other part of the space 53. The widths Y of the space 53 are gradually decreased toward the installation base member 11.

An inner-cabin space end 53a and an outer-cabin space end 53b of the space 53 have curved surfaces and are defined on an inner surface of the outer coat 52a of the hollow part 52.

A first conductive part 54 on an upper part of the hollow part has a crescent-shaped cross section. Lower parts 54a, 54a of the first conductive part 54 are closer to the installation base member 11 than an apex 55a of the second conductive part 55. With this configuration, even in case the hollow part 52 slightly bends, the first and second conductive parts 54, 55 easily come into contact with each other, and do not pass each other on a point of contact.

In other words, as illustrated in FIG. 5, a distance L1 is longer than at least one other part of the hollow part 52 in cross section in the inner-cabin and outer-cabin direction. The distance L1 is between the apex 52d and the apex 52e. The distance L1 is longer than a distance L2. The distance L2 is between the connecting point Q and the connecting point R.

The distance L2 is longer than a distance L3. The distance L3 is longer than at least one other part of the space 53 in the inner-cabin and outer-cabin direction.

With this configuration, the convex substances, keys for example, touch the part of the hollow part 52 slightly closer to the top end P than the connecting point Q, not the connecting point Q, while passengers are getting on or off the automobiles. Since the part of the hollow part 52, which the convex substances touch, is increased in thickness, the hollow part 52 is not damaged or torn by the convex substances.

The abrasion resistance was tested using the protector 10 (article of the invention) with the protrusion 100 and the protector 10 (article of prior art) without the protrusion 100. Specifically, the test includes: coupling the protectors 10 to the flanges which are inclined at 25 degrees; vertically pressing top ends of the key relative to the protectors 10 at a weight of 30 N and horizontally moving the top ends at a speed of 100 mm/sec such that the top ends touch the protectors 10; and counting number of touches before the hollow seal members 12 begin to be worn away.

The results show that the article of the invention is considerably superior to the article of prior art in abrasion resistance for the article of the invention begins to be worn away after twice as many touches as the article of the prior art.

We claim:

1. A protector with a sensor, the protector comprising:
    an installation base member configured to operably couple to a flange of a sliding door, the flange protruding toward a front part of an automobile body from a front edge of the sliding door, the sliding door moving between at least two positions to open and close a door opening of the automobile body, the installation base member having a substantially U-shaped cross section including an inner-cabin side wall, an outer-cabin side wall, and a connecting wall which connects the side walls, the installation base member extending in an upper and lower direction of the automobile body; and
    a hollow part unified with the connecting wall of the installation base member and extending toward the front part of the automobile body, the hollow part having a shape of a tube, the hollow part having core wires, first and second conductive parts, and a space, each of the first and second conductive parts having a respective one of the core wires embedded therein, the space being positioned between the first and second conductive parts, the hollow part having an inner-cabin side end and an outer-cabin side end each being connected with the installation base member, the inner-cabin side end and the outer-cabin side end being at a distance from each other along the installation base member,
    the first and second conductive parts including the first conductive part on an upper part of the hollow part and the second conductive part on a lower part of the hollow part, the second conductive part being positioned within the hollow part between the inner-cabin side end and the outer-cabin side end adjacent the installation base member and the first conductive part being spaced apart from the second conductive part, the first and second conductive parts being shaped and positioned in a manner that an inner-cabin space end of the space is defined on an inner surface of a part of an outer coat closer to an interior of the automobile body of the hollow part, in which
    when an object is disposed between the sliding door and the opening, and makes contact with the hollow part when the sliding door is moved towards a closed position, an electric signal provides an indication that the object is in the opening, wherein
    a protrusion is formed on a first part of the inner-cabin side wall of the installation base member, the first part being closer to the connecting wall than a second part opposite the first part, the protrusion being on a virtual line in cross section, the virtual line being where convex substances hanging on passengers' clothes conceivably pass through, the virtual line extending toward a connecting point from a rear part of the automobile body closer to the interior of the automobile body than a reference line, the reference line being parallel with a direction in which the flange protrudes and extending from the connecting point, the connecting point being a part of the inner-cabin side end of the hollow part closest to the interior of the automobile body, the inner-cabin side end being connected with the installation base member.

2. The protector as claimed in claim 1, wherein the protrusion includes a part which protrudes toward the interior of the automobile body from the inner-cabin side wall and extends between a first end of the inner-cabin side wall closest to the connecting wall and a second end opposite the first end.

3. The protector as claimed in claim 1, wherein the virtual line overlaps with an oblique line which extends toward the rear part of the automobile body closer to the interior of the automobile body than the reference line from the connecting point with an angle of inclination to the reference line of 25 degrees.

4. The protector as claimed in claim 2, wherein the virtual line overlaps with an oblique line which extends toward the rear part of the automobile body closer to the interior of the automobile body than the reference line from the connecting point with an angle of inclination to the reference line of 25 degrees.

* * * * *